(12) United States Patent
Chen

(10) Patent No.: US 8,546,715 B2
(45) Date of Patent: Oct. 1, 2013

(54) KEY DEVICE FOR MOBILE PHONE

(75) Inventor: Wei Chen, Huizhou (CN)

(73) Assignee: Huizhou TCL Mobile Communication Co., Ltd., Huizhou, Guangdong Province (CN)

( * ) Notice: Subject to any disclaimer, the term of this patent is extended or adjusted under 35 U.S.C. 154(b) by 126 days.

(21) Appl. No.: 13/265,333

(22) PCT Filed: Jun. 25, 2010

(86) PCT No.: PCT/CN2010/074523
§ 371 (c)(1),
(2), (4) Date: Oct. 19, 2011

(87) PCT Pub. No.: WO2011/035623
PCT Pub. Date: Mar. 31, 2011

(65) Prior Publication Data
US 2012/0037484 A1  Feb. 16, 2012

(30) Foreign Application Priority Data

Sep. 28, 2009 (CN) .......................... 2009 1 0190592

(51) Int. Cl.
H01H 1/14 (2006.01)
H01H 13/14 (2006.01)

(52) U.S. Cl.
USPC ........................................ 200/534

(58) Field of Classification Search
USPC ................. 200/534, 5 R, 5 A, 402, 513, 275, 200/276.1, 292, 405, 406, 468, 17 R, 18, 200/46, 512, 520, 521, 279
See application file for complete search history.

(56) References Cited

U.S. PATENT DOCUMENTS

2007/0007112 A1* 1/2007 Hashida ........................ 200/5 A
2007/0247828 A1* 10/2007 Kim ............................... 362/24

FOREIGN PATENT DOCUMENTS

| CN | 1606321 A | 4/2005 |
|---|---|---|
| CN | 101674349 A | 3/2010 |
| KR | 100681010 B1 | 2/2007 |

* cited by examiner

Primary Examiner — Edwin A. Leon
Assistant Examiner — Anthony R. Jimenez
(74) Attorney, Agent, or Firm — Cheng-Ju Chiang

(57) ABSTRACT

The present invention discloses a key device for a mobile phone, which comprises a printed circuit board (PCB), a key disposed on the PCB and a metal dome disposed above the key. The metal dome is able to make electrical contact with the key. The key comprises a first electrode, a second electrode and a third electrode, and the third electrode is formed as two rings in which the first electrode and the second electrode are disposed respectively. In the key device for a mobile phone provided by the present invention, the key is formed with three electrodes, so when the metal dome makes contact with the first electrode or the second electrode, the three electrodes of the key are electrically connected with each other simultaneously. This imparts the key for a mobile phone with the compatibility, thereby reducing the product cost and shortening the duration of research and development.

17 Claims, 2 Drawing Sheets

KEY DEVICE FOR MOBILE PHONE

CROSS-REFERENCE TO RELATED APPLICATIONS

The present application is a 35 U.S.C. §371 National Phase conversion of International (PCT) Patent Application No. PCT/CN2010/074523, filed on Jun. 25, 2010, the disclosure of which is incorporated by reference herein. The PCT International Patent Application was published in Chinese.

TECHNICAL FIELD

The present invention generally relates to a key structure for an electronic circuit, and particularly, to a key device for a mobile phone.

BACKGROUND

Nowadays, keys on electronic products are generally classified into Carbon keys (silicone keys) and DOME keys (metal dome keys). The Carbon keys are suitable for products having low requirements on the appearance such as electronic game machines and TV remote-controller. The DOME keys are suitable for products having high requirements on the appearance such as mobile phones and control keys for TVs.

Currently, common mobile phones usually adopt DOME key devices. As shown in FIG. 1, a DOME key device comprises a circuit board 110, a metal dome (not shown) and a key. The key comprises two electrodes, i.e., a fourth electrode 120 and a fifth electrode 130. When the metal dome is pressed down, the fourth electrode 120 and the fifth electrode 130 are electrically connected with each other to accomplish the key function of the mobile phone.

As there are different consumer groups in the market, different styles and types of mobile phones have been developed and, accordingly, different mainboards are used by the different types of mobile phones. However, some types of mobile phones have similar mainboards; e.g., a mainboard of a U10 type mobile phone is different from that of a U2 type mobile phone only in positions of some keys. If it is desired to produce the U10 type mobile phone by using the mainboard of the U2 type mobile phone, then use of two PCBs is usually needed, which increases the cost of the product and prolongs the duration of research and development. Therefore, mainboards of conventional mobile phones are incompatible, which brings inconvenience to the production.

Accordingly, a need still exists in the art to improve the design of the existing keys.

SUMMARY OF THE DISCLOSURE

An objective of the present invention is to provide a key device for a mobile phone, in which a key disposed on a circuit board has the compatibility so that a mainboard of one type of mobile phone is compatible with mainboards of other types of mobile phones.

To achieve the aforesaid objective, the present invention adopts the following technical solution:

A key device for a mobile phone, comprising a printed circuit board (PCB), a key disposed on the PCB and a metal dome disposed above the key, the metal dome being able to make electrical contact with the key, wherein the key comprises a first electrode, a second electrode and a third electrode, and the third electrode is formed as two rings in which the first electrode and the second electrode are disposed respectively; the first electrode and the second electrode are electrically connected with each other to adapt to different key positions of different types of mobile phones; and the metal dome is disposed to have the third electrode and the first electrode make electrical contact with each other or have the third electrode and the second electrode make electrical contact with each other.

In the key device for a mobile phone, the first electrode is in the form of a circle, an ellipse, or a circle with a trimmed edge.

In the key device for a mobile phone, the second electrode is in the form of a circle, an ellipse, or a circle with a trimmed edge.

In the key device for a mobile phone, a center point of the first electrode and a center point of the second electrode coincide with center points of the rings where they are located respectively.

In the key device for a mobile phone, the key is an "OK" key on the PCB adjacent side thereof.

According to the key device for a mobile phone provided by the present invention, the key is formed with three electrodes and has the first electrode and the second electrode of the key electrically connected with each other, so when the metal dome makes contact with the first electrode or the second electrode, the three electrodes of the key are electrically connected with each other simultaneously. This imparts the key for a mobile phone with the compatibility so that a mainboard of one type of mobile phone is compatible with mainboards of other types of mobile phones, thereby reducing the product cost and shortening the duration of research and development.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present disclosure in detail.

The present invention provides a key device for a mobile phone. In order to illustrate the objectives, technical solutions and effects of the present invention more clearly, the present invention will be further detailed in conjunction with the attached drawings and embodiments thereof hereinafter.

Currently, there are many types of mobile phones, which are equipped with different mainboards respectively. Generally, mainboards of different types of mobile phones cannot be interchanged; e.g., although a mainboard of a U10 type mobile phone is similar to that of a U2 type mobile phone, they are still differ in positions of some keys on respective circuit boards. For example, numerical keys of the two types of mainboards are identical, but positions of "OK" keys thereof on the circuit boards are slightly offset from each other. If it is desired to produce the U10 type mobile phone by using the mainboard of the U2 type mobile phone, then two PCBs have to be adopted in the layout (circuit wiring of the PCBs) design, which increases the product cost and prolongs the duration of research and development. In view of this, the present invention makes an improvement on the key structure for a mainboard of a mobile phone in such a way that a mainboard of one type of mobile phones is compatible with mainboards of other types of mobile phones.

Figure 1:
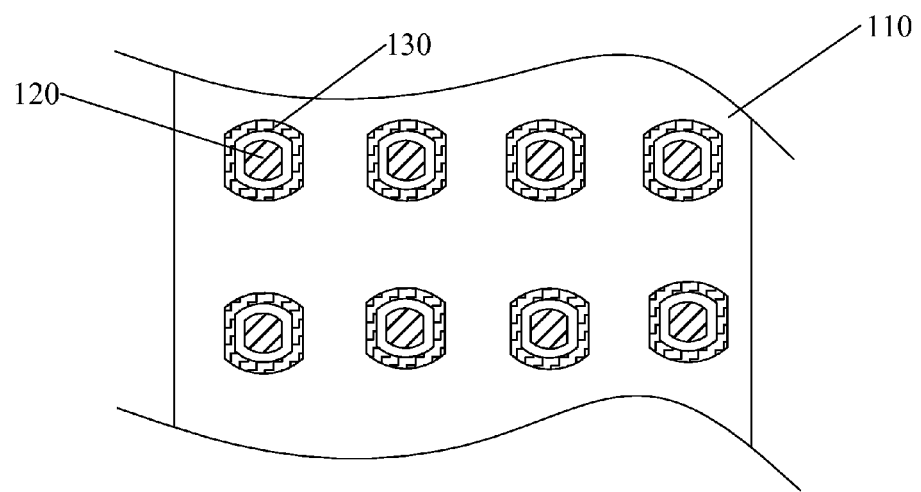
FIG. 1 is a schematic view illustrating a structure of a key device in the prior art.
Figure 2:
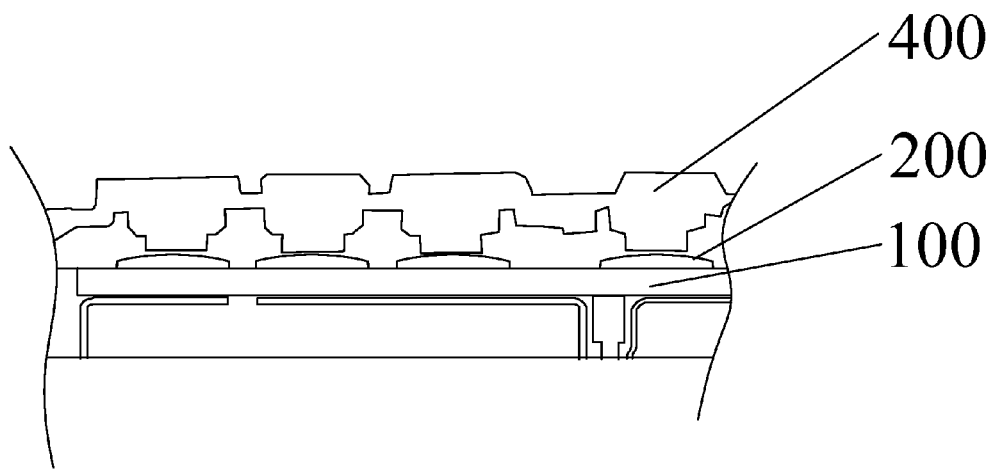
FIG. 2 is a schematic side view illustrating a structure of a key for a mobile phone according to the present invention.
Figure 3:
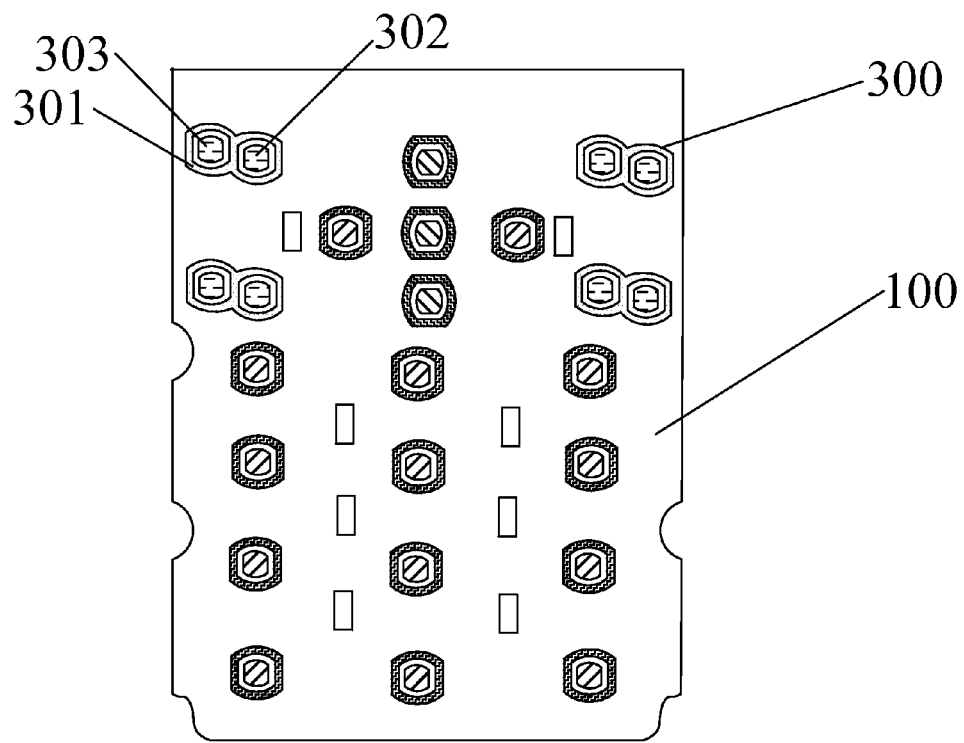
FIG. 3 is a schematic view illustrating a structure of the key device for a mobile phone according to the present invention.
Figure 4:
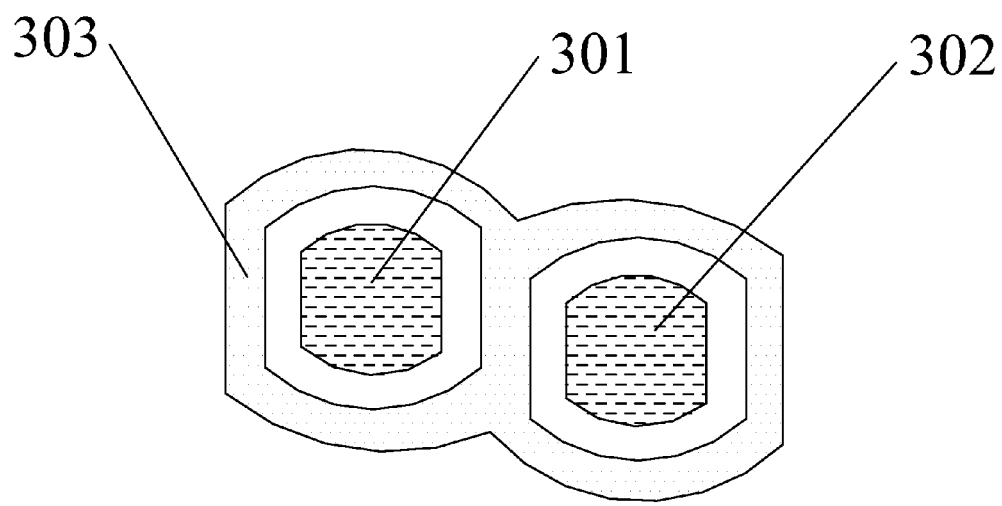
FIG. 4 is a schematic enlarged view illustrating a key of the key device for a mobile phone according to the present invention.

As shown in FIG. 2, FIG. 3 and FIG. 4, the key device for a mobile phone provided by the present invention comprises a PCB 100, a metal dome 200, a key 300 and a mobile phone keypad 400. The key 300 generally consists of a copper foil and is disposed on the PCB 100, and the metal dome 200 is disposed above the key. When being pressed down, the key is closed by means of the metal dome and then, through processing by a microprocessor (not shown) of the mobile phone, the key function is accomplished. The mobile phone keypad 400 is installed above the metal dome. Common keypads are classified into PC+ rubber keys, PC+ film keys and the like. During operation, a user only needs to press down the key on the mobile phone keypad 400 so that the metal dome 200 is deformed to make electrical contact with the key 300 to accomplish the key function of the mobile phone.

In order to impart the key with the compatibility so that a mainboard of one type of mobile phone is compatible with mainboards of other types of mobile phones, the present invention makes an improvement on the key for a mainboard of a mobile phone. As shown in FIG. 4, the key for a mobile phone provided by the present invention comprises three electrodes, i.e., a first electrode 301, a second electrode 302 and a third electrode 303. Before the metal dome of the mobile phone is pressed down, the first electrode 301 and the second electrode 302 of the mobile phone are electrically connected with each other to adapt to different key positions of different types of mobile phones. When the metal dome is deformed to make contact with the first electrode 301 or the second electrode 302 of the key, the first electrode 301, the second electrode 302 and the third electrode 303 of the key are electrically connected with each other simultaneously. In this case, an electrical signal is generated and then processed by the microprocessor of the mobile phone so as to accomplish the key function of the mobile phone. The metal dome is disposed to have the third electrode and the first electrode make electrical contact with each other or have the third electrode and the second electrode make electrical contact with each other.

In this way, a compatible key formed with three electrodes is provided to cater for different key positions on different mainboards of mobile phones. This makes a mainboard of one type of mobile phones compatible with mainboards of other types of mobile phones, thereby reducing the product cost and shortening the duration of research and development.

As shown in FIG. 4, there is shown a preferred embodiment of the present invention. The third electrode 303 of the key may be formed as two rings, which may intersect with or tangent to each other or connected in other ways; and the first electrode 301 and the second electrode 302 of the key are disposed within the two rings of the third electrode respectively. In this embodiment, the third electrode 303 may be disposed longitudinally or transversely depending on the key position on the mainboard of the mobile phone. Of course, the electrodes of the present invention may also be in the form of other shapes (e.g., the third electrode is formed as only one ring, in which the first electrode and the second electrode are disposed) so long as when the metal dome makes contact with the first electrode or the second electrode, the three electrodes of the key are electrically connected with each other to accomplish the key function of the mobile phone.

The first electrode 301 or the second electrode 302 may be formed in the form of a circle, an ellipse, or a circle with a trimmed edge. In a preferred embodiment, circular electrodes each formed with two trimmed edges are used in order to facilitate wiring of the hardware of the circuit board, as shown in FIG. 4. Of course, the electrodes of the present invention may also be of other shapes such as a rectangle with round corners or other irregular shapes. In order to keep the entire key aesthetic, in this embodiment, the shape of the second electrode may be formed to be identical to that of the first electrode.

In a further embodiment, a center point of the first electrode 301 coincides with a center point of the ring of the third electrode 303 where it is located, and correspondingly, a center point of the second electrode 302 coincides with a center point of the ring of the third electrode 303 where it is located. For example, when the first electrode is a circular electrode, the three electrodes of the key form a structure of double concentric circles.

In a further embodiment, as shown in FIG. 3, in order to have the mainboard of the U2 type mobile phone shared by the U10 type mobile phone, the key of the present invention may be used for an "OK" key disposed on the PCB of the mobile phone adjacent side thereof and have the third electrode thereof disposed transversely. Thus, when the metal dome makes contact with the first electrode or the second electrode, the key can be closed to accomplish the compatibility of the "OK" key.

It shall be appreciated that, in the key device of the present invention, the key may be disposed at other positions of the PCB (e.g., a position of a numerical key or a direction key) according to different key positions on the mainboards of other types of mobile phones, thereby making a mainboard of one type of mobile phones compatible with mainboards of other types of mobile phones. In other words, although there may be many types of mobile phones, all the types of mobile phones can use a universal mainboard, thus reducing the cost and shortening the duration of research and development. Of course, the key device provided by the present invention is not merely limited to use in mobile phones, but can also be applied to remote controllers for TVs, remote controllers for air conditioners, control keys for TVs or high-end electronic products, and the like.

In a further embodiment, the present invention may use a metal dome with a stroke less than 0.3 mm to form an ultra-thin key, thus accomplishing miniaturization of electronic products.

In the key device for a mobile phone provided by the present invention, the key is formed with three electrodes and has the first electrode and the second electrode of the key electrically connected with each other, so when the metal dome makes contact with the first electrode or the second electrode, the three electrodes of the key are electrically connected with each other simultaneously. This makes a mainboard of one type of mobile phones compatible with mainboards of other types of mobile phones, thereby reducing the cost of the products and shortening the duration of the research and development.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A key device for a mobile phone, comprising a printed circuit board (PCB), a key disposed on the PCB and a metal dome disposed above the key, the metal dome being able to make electrical contact with the key, wherein the key comprises a first electrode, a second electrode and a third electrode, and the third electrode is formed as two rings in which the first electrode and the second electrode are disposed, respectively; the first electrode and the second electrode are electrically connected with each other to adapt to different key positions of different types of mobile phones; and the metal dome is disposed to have the third electrode and the first electrode make electrical contact with each other or have the third electrode and the second electrode make electrical contact with each other.

2. The key device for a mobile phone of claim 1, wherein the first electrode is in the form of a circle, an ellipse, or a circle with a trimmed edge.

3. The key device for a mobile phone of claim 2, wherein the second electrode is in the form of a circle, an ellipse, or a circle with a trimmed edge.

4. The key device for a mobile phone of claim 1, wherein a center point of the first electrode and a center point of the second electrode coincide with center points of the rings where they are located, respectively.

5. The key device for a mobile phone of claim 1, wherein the key is an "OK" key on a PCB adjacent side thereof.

6. A key device for a mobile phone, comprising:
a printed circuit board (PCB) comprising a plurality of keys disposed thereon; and
a plurality of metal domes disposed above the plurality of keys, respectively;
wherein at least one of the plurality of keys comprises a first electrode and a second electrode electrically connected with each other and surrounded in a third electrode, the third electrode is formed as two rings in which the first electrode and the second electrode are disposed, respectively, and when a corresponding metal dome thereof is being pressed to an established position, the first, second and third electrodes are electrically connected with each other.

7. The key device for a mobile phone of claim 6, wherein the corresponding metal dome being able to make electrical contact with the at least one key, and the first electrode and the second electrode are electrically connected with each other to adapt to different key positions of different types of mobile phones.

8. The key device for a mobile phone of claim 6, wherein the first electrode is in the form of a circle, an ellipse, or a circle with a trimmed edge.

9. The key device for a mobile phone of claim 8, wherein the second electrode is in the form of a circle, an ellipse, or a circle with a trimmed edge.

10. The key device for a mobile phone of claim 6, wherein a center point of the first electrode and a center point of the second electrode coincide with center points of the rings where they are located, respectively.

11. The key device for a mobile phone of claim 6, wherein the at least one key is an "OK" key on a PCB adjacent side thereof.

12. A mobile phone keypad device comprising:
a printed circuit board (PCB) comprising a plurality of keys disposed thereon; and
a plurality of metal domes disposed above the plurality of keys, respectively;
a mobile phone keypad positioned on the plurality of metal domes;
wherein at least one of the plurality of keys comprises a first electrode and a second electrode electrically connected with each other and surrounded in a third electrode, the third electrode is formed as two rings in which the first electrode and the second electrode are disposed, respectively, and when a corresponding metal dome thereof is being pressed to an established position, the first, second and third electrodes are electrically connected with each other.

13. The mobile phone keypad device of claim 12, wherein the corresponding metal dome being able to make electrical contact with the at least one key, and the first electrode and the second electrode are electrically connected with each other to adapt to different key positions of different types of mobile phones.

14. The mobile phone keypad device of claim 12, wherein the first electrode is in the form of a circle, an ellipse, or a circle with a trimmed edge.

15. The mobile phone keypad device of claim 14, wherein the second electrode is in the form of a circle, an ellipse, or a circle with a trimmed edge.

16. The mobile phone keypad device of claim 12, wherein a center point of the first electrode and a center point of the second electrode coincide with center points of the rings where they are located, respectively.

17. The mobile phone keypad device of claim 12, wherein the at least one key is an "OK" key on a PCB adjacent side thereof.

* * * * *